United States Patent [19]

Bhaskaran et al.

[11] Patent Number: 5,194,537
[45] Date of Patent: Mar. 16, 1993

[54] PROCESS FOR THE PREPARATION OF NITRILE GROUP CONTAINING POLYMERS

[75] Inventors: Durairaj Bhaskaran; Pradeep K. Dhal; Sanjay P. Kashikar; Ratnaprabha S. Khisti; Babanrao M. Shinde; Swaminathan Sivaram, all of Pune, India

[73] Assignee: Council of Scientific & Industrial Research, New Delhi, India

[21] Appl. No.: 585,689

[22] Filed: Sep. 19, 1990

[51] Int. Cl.$^5$ ............... C08F 4/00; C08F 120/42; C08F 120/44
[52] U.S. Cl. ............... 526/204; 526/217; 526/297; 526/341
[58] Field of Search ............... 526/204, 217

[56] References Cited

U.S. PATENT DOCUMENTS 3,886,128 5/1975 Frump ............... 526/204
3,929,748 12/1975 Jurisch ............... 526/204

*Primary Examiner*—Joseph L. Schofer
*Assistant Examiner*—Wu C. Cheng
*Attorney, Agent, or Firm*—Ladas & Parry

[57] ABSTRACT

An improved process is disclosed for the preparation of nitrile group containing polymers which comprises reacting a nitrile group containing vinyl monomer with an initiator of the general formula $[ArCR_1R_2]\ominus[N(R_3R_4R_5R_6)]\oplus$ wherein Ar=phenyl, substituted phenyl or a heterocyclic compound, $R_1=R_2=H$, ester, cyano, alkyl, aryl, 1,3-oxazoline, N,N-dimethyl amide and other similar alpha activating groups, or combination of them, or one of $R_1$ or $R_2$ together with Ar, where Ar is phenyl or substituted phenyl, is a nitrogen atom containing heterocyclic compound and the other being a nitrile group, $R_3$, $R_4$, $R_5$ and $R_6$ may be same or different and represent substituted alkyl, cycloalkyl, arylalkyl or aryl or two of the $R_3$, $R_4$, $R_5$ and $R_6$ together with nitrogen atom form a heterocycle with the condition that the sum of all carbon atoms or all $R_3$, $R_4$, $R_5$ and $R_6$ is from 12 to 50 and no more than one of the $R_3$, $R_4$, $R_5$ and $R_6$ is an aryl derivative in an inert atmosphere at a temperature not exceeding 60° C. Polymers with molecular weights in the range of 500 to 25,000 can be prepared. Of these polyacrylonitrile, polymethacrylonitrile and the like are known to be very useful and have diverse commercial applications.

8 Claims, No Drawings

PROCESS FOR THE PREPARATION OF NITRILE GROUP CONTAINING POLYMERS

This invention relates to an improved process for the preparation of nitrile group containing polymers. The nitrile group containing polymers prepared by the process of invention may be polyacrylonitrile, polymethacrylonitrile and the like.

High molecular weight polyacrylonitrile are fiber forming polymers. Polymers containing >90% acrylonitrile are commonly referred to as acrylic fibers and are produced commercially. Chemically modified polyacrylonitrile have diverse commercial applications in areas such as dispersants and flocculents in water treatment, oil well chemicals for enhanced oil recovery and as speciality polymers for mineral beneficiation, surface coatings, lubricant oil additives etc. Oligomeric polyacrylonitrile and their modified derivatives find applications as synthetic thickening agents for printing inks in textile industries. Polyacrylonitrile are also commercially important precursor fibers for the manufacture of carbon fibers useful as components of advanced materials. Polymers bearing methacrylonitrile groups have commercially useful barrier properties and are useful in packaging applications.

Anionic polymerization of acrylic monomers can be initiated by
 (a) organolithium/organomagnesium or organosodium compounds
 (b) using ketene silyl acetals as initiators in the presence of a fluoride, bifluoride, cyanide or azides as catalysts or (c) using metal free carbon nucleophiles as initiators.

Method described at (a) above has been successfully applied for the controlled synthesis of styrene and diene polymers. However, application of the process to acrylonitrile does not lead to desired results [A. Ottolenghi and A. Zilkha, J. Polym. Sci., Part A 1, 687 (1963); 3643 (1963)]. Depending on catalyst concentration, homogeneous anionic polymerization of acrylonitrile by butyllithium showed spontaneous termination by chain transfer to monomer or intramolecular cyclization reactions of the growing chain end. Molecular weight control by control of initiator concentration could be achieved only at very low initiator concentrations.

Method described at (b) above when applied to acrylonitrile led to uncontrolled polymerization leading to gel formation. Only at −50° C. the polymerization could be controlled. Nevertheless, polydispersity was broad (3.79) [D. Y. Sogah, W. R. Hertler, D. W. Webster and G. M. Cohen, Macromomolecules, 20 1473 (1987)].

Method described at (c) above though effective for acrylic ester monomers, does not appear to be applicable to controlled polymerization of very reactive nitrile bearing vinyl monomers [M. T. Reetz, Angew. Chem. Int., Ed. Engl. 27 (7), 994 (1988)].

Thus, these prior art processes are not satisfactory for the preparation of nitrile bearing polymers in a controlled manner.

Polyacrylonitrile/acrylonitrile copolymers are generally produced by free radical polymerization processes using redox type initiators in aqueous medium. Such processes are known to be deficient in the following respects:

a) Polymerization is normally conducted in the temperature range of 70°-90° C.

b) The initiators used normally contain metals. Since metallic residues are detrimental to polymer, washing of polymer and removal of metal residues is essential.

c) Molecular weight control normally requires addition of external agents, called chain transfer agents.

d) Polymers produced have broad molecular weight distribution; polydispersity values generally are in the range of 2.5 to 3.0.

e) It is difficult to produce by this method, polymers of precisely controlled molecular weights.

f) The method is not suitable for introduction of functional groups at the polymer chain end.

Most of the drawbacks of the free radical processes can be obviated by the use of anionic polymerization process. Anionic processes generally afford more control on polymerization, use relatively lower temperatures and produce narrow molecular weight distribution polymers. Control of molecular weight is possible by adjusting the initiator concentrations. However, the present state of the art of anionic polymerization of acrylonitrile or acrylic acid esters as monomers is beset with the following drawbacks:

a) The reactions initiated by conventional anionic intiators such as organolithium, organomagnesium compounds require low reaction temperatures (−50° to −75° C.) for adequate control of reaction.

b) Reactions at higher temperatures become progressively less controllable, leading to unwanted side reactions and resulting in polymers with broad molecular weight distributions.

c) Commonly used initiators enter into wasteful side reactions with nitrile group in acrylonitrile. Recently a new polymerization technique has been discovered, which offers advantages in polymerizing acrylic type monomers over conventional anionic polymerization processes. This technique, termed in the literature as "Group Transfer Polymerization (GTP)" involves the use of initiators containing silicon atoms (e.g. 1-methoxy-2-methyl-1-trimethylsiloxy-1-propene) and a catalyst generally containing a fluoride ion (e.g. tetrabutyl ammonium fluoride). Whereas the use of this initiator/catalyst system with monomers such as acrylic acid esters leads to a well controlled/defined polymers with narrow molecular weight distribution, the extension of this system to acrylonitrile/methacrylonitrile has not met with success. These monomers are still too reactive for group transfer initiator/catalysts system and even at low temperatures, uncontrollable reactions occur leading to polymers with molecular weight distribution, as broad as 3.5-3.9.

More recently, a class of metal free carbanion initiators have been described in the literature for controlled polymerization of acrylic acid esters at room temperature. However, the literature does not reveal its applicability to the polymerization of nitrile bearing monomers.

The main object of the present invention is (a) to provide a process for the polymerization of acrylonitrile/methacrylonitrile and other nitrile bearing unsaturated compounds using metal free anionic initiators in solution or slurry; (b) to enable the polymerization to be conducted in the temperature range 0° to +60° C., with adequate control on polymerization (c) to enable the production of polymers with a wide range of molecular weights by mere control of initiator concentration and (d) to produce polymers with reasonably narrow molecular weight distributions.

Acrylonitrile is a reactive vinyl monomer with high Q and e value (Q=1.20, e=0.60) and hence amenable to polymerization using anionic polymerization initiator. Conventional anionic initiators, like organolithium, organosodium or organomagnesium compounds react with both the double bond as well as the nitrile group, leading to a number of unwanted side reactions and products. The main object of the present invention is to provide an improved process for the preparation of nitrile containing polymers overcoming the above said drawbacks in the hitherto known process.

The present invention is based on the principle of resonance stabilized carbanions (initiators) that can provide a range of reactivities suitable for vinyl polymerization of activated monomers such as acrylonitrile/methacrylonitrile etc.

In our copending application number U 7718 CASE I, we have described and claimed a process for the preparation of novel initiators (resonance stabilised carbanions) of the general formula $[ArCR_1R_2]^\ominus[N(R_3R_4R_5R_6)]^\oplus$ wherein Ar=phenyl, substituted phenyl, or a heterocyclic compound, $R_3=R_2=H$, ester, cyano, alkyl, aryl, 1,3-oxazoline, N,N-dimethyl amide and other similar alpha activating groups or combination of them, or one of $R_1$ or $R_2$ together with Ar, where Ar a phenyl or substituted phenyl, is a nitrogen atom containing heterocyclic compound and the other being a nitrile group. $R_3$, $R_4$, $R_5$, and $R_6$ may be same or different and are each hydrocarbyl groups of 3 to 16 carbon atoms and represent alkyl, substituted alkyl, cycloalkyl, arylalkyl or aryl or two of the $R_3$, $R_4$, $R_5$, and $R_6$ together with nitrogen atom form a heterocyclic ring of 5 to 7 atoms with the condition that the sum of all $R_3$, $R_4$, $R_5$ and $R_6$ is from 12 to 50 and no more than one of the $R_3$, $R_4$, $R_5$, and $R_6$ is an aryl derivative. The said process consists of treating organic compounds containing labile hydrogens and having a general structure $ArCHR_1R_2$, where Ar=-phenyl or substituted phenyl or a heterocyclic group and $R_1=R_2=H$, COOEt, CN, Ph, alkyl, 1,3-ozazoline groups, N,N-dimethyl amide or combination of them; or one of the $R_1$ or $R_2$ together with Ar where Ar is a phenyl or substituted phenyl, is a nitrogen atom containing heterocyclic compound and the other being a nitrile group, (examples, 2-benzyl-1,3-oxazoline, diethylphenylmalonate, methylphenylacetate, diethylmalonate, 1-cyanodihydro isoquinoline, N,N-dimethyl phenylacetamide, bis (N,N-dimethylamide)phenyl methane, phenylmalononitrile and phenylacetonitrile etc.), with a base generally soluble in organic solvents (example, tetrabutyl ammonium hydroxide, benzyltri-n-butyl ammonium hydroxide etc.). The initiator can be isolated either as an oil or as solids and stored under suitable condition. Tetra-n-butyl ammonium 2-benzyl-1,3-oxazoline; tetra-n-butyl ammonium diethyl phenyl malonate; tetra-n-butyl ammonium methylphenylacetate; tetra-n-butyl ammonium ethylcyanoacetate; tetra-n-butyl ammonium 2-methyl-1,3-oxazoline and tetra-n-butyl ammonium-N-benzoxy-2-cyanodihydro isoquinoline are some of the examples of the initiators.

The said process consists of treating these initiators with nitrile group containing vinyl monomers in a suitable solvent in the temperature range 0° to +60° C. By appropriate adjustment of the monomer to initiator ratio, polymers with molecular weights in the range of 500 to 25,000 can be prepared. The molecular weight is controllable by adjustment of monomer to initiator ratio only indicating that the polymerization is free from unwanted side reactions such as chain transfer, termination, intramolecular cyclization etc.

Uptil now initiators as mentioned above have not been used for polymerization of nitrile bearing monomers. Even the initiators that are used in group transfer polymerization methods, a recently discovered method for controlled polymerization of acrylic ester monomers, fail to polymerize acrylonitrile with any degree of control at temperatures as low as −50° C.

Accordingly, the present invention provides an improved process for the preparation of nitrile group containing polymers which comprises reacting a nitrile group containing vinyl monomer with an initiator of the general formula $[ArCR_1R_2]^\ominus[N(R_3R_4R_5R_6)]^\oplus$ wherein Ar=phenyl, substituted phenyl or a heterocyclic compound, $R_1=R_2=H$, ester, cyano, alkyl, aryl, 1,3-oxazoline, N,N-dimethyl amide and other similar alpha activating groups, or combination of them, or one of $R_1$ or $R_2$ together with Ar, where Ar is phenyl or substituted phenyl, is a nitrogen atom containing heterocyclic compound and the other being a nitrile group, $R_3$, $R_4$, $R_5$ and $R_6$ may be same or different and are each hydrocarbyl groups of from 3 to 12 carbon atoms and represent alkyl, substituted alkyl, cycloalkyl, arylalkyl or aryl or two of the $R_3$, $R_4$, $R_5$ and $R_6$ together with nitrogen atom form a heterocyclic ring of 5 to 7 atoms with condition that the sum of all carbon atoms of all $R_3$, $R_4$, $R_5$ and $R_6$ is 12 to 50 and no more than one of the $R_3$, $R_4$, $R_5$ and $R_6$ is an aryl derivative, in an inert atmosphere at temperature not exceeding 60° C.

Typically the groups $R_3$, $R_4$, $R_5$ and $R_6$ are alkyl groups of 3–16 carbon atoms, cycloalkyl groups of 5 to 8 carbon atoms arylalkyl groups of 7 to 10 carbon atoms and aryl groups of 6 carbon atoms.

The nitrile group containing vinyl monomer may be selected from the general formula $CH_2=C(Y)X$ where X=CN and Y=$CH_3$, H, —$C_6H_5$, $C_6H_5CH_2$. The inert atmosphere may be achieved using dry nitrogen or argon and the like. The reaction may preferably be effected in the presence of solvents like tetrahydrofuran, dimethyl formamide and the like.

The reaction mixture may be agitated and may be held at the constant temperature for the period of 2 hours, preferred time being 1 hour.

The resultant polymer may be either precipitated out as a slurry or kept as a homogenous solution depending on the use of solvents. The polymer prepared by the process have Mn in the range of 500–25,000 and has a narrow polydispersity index in the range of 1.0–2.0. The yield of the polymer is almost quantitative.

The reaction tends to slow down or even stop when impurities with acidic hydrogen are present.

The invention is described with reference to the following examples which should not be construed to limit the scope of the invention.

EXAMPLE 1

Polymerization of Acrylonitrile using initiator tetra-n-butyl ammonium 2-benzyl-1,3-oxazoline in Tetrahydrofuran A dry three necked 100 mL flask fitted with thermometer, nitrogen inlet, rubber septum and magnetic needle was charged with 30 mL dry THF under dry nitrogen atmosphere. To it 0.4 g (1 mmol) of the initiator 1 was added and the reactor was cooled to +2° C. Subsequently, 3.2 g (60 mmol) of acrylonitrile was injected slowly. The temperature rose from +2° C. to +6° C. After 15 minutes, the temperature came back to its original value of +2° C. The reaction was allowed to continue for 1 hour and was terminated by pouring into 150 mL of methanol. The solid mass was filtered and dried under vacuum giving 2.85 g of poly(acrylonitrile) (89% conversion). Vapour pressure osmometry gave a $\overline{M}n$ of 2690 (calc value 3180).

EXAMPLE 2

Polymerization of Acrylonitrile using Initiator tetra-n-butyl ammonium 2-benzyl-1,3-oxazoline in N,N-dimethyl formamide A 100 mL three necked flask having accessories as in the case of example 1, was charged with 30 ml of dry DMF and 0.08 g (0.2 mmol) of the initiator 1 and cooled to +2° C. To it, 4 g (76 mmol) of acrylonitrile, was added slowly under nitrogen. The temperature rose to +5° C. After 1 hour, the reaction was terminated by pouring into 150 ml methanol. The polymer was filtered off and dried under vacuum yielding 2.6 g (65% conversion) of poly(acrylonitrile). The polydispersity index as determined by gel permeation chromatography was 1.7.

EXAMPLE 3

Polymerization of Acrylonitrile using Initiator tetra-n-butyl ammonium diethyl phenyl malonate in Tetrahydrofuran A dry 100 mL three necked flask equipped with magnetic needle, nitrogen/argon inlet tube, rubber septum and thermometer inlet, was charged with 15 mL of dry THF under argon atmosphere. To it 0.294 mmoles of the initiator 2 was added. Subsequently 3.2 g (60 mmoles) of acrylonitrile was added to flask at +28° C. slowly. The reaction temperature spontaneously increased from +28° C. to +43° C. After 1 hour the reaction was terminated by addition of acidified methanol and precipitated by pouring into excess of methanol. The solid poly(acrylonitirle) polymer was filtered and dried in vacuum at +50° C. to give 2.6 g polymer (81% conversion). The polydispersity index as measured by gel permeation chromatography was 1.16.

EXAMPLE 4

Polymerization of Acrylonitrile using Initiator tetra-n-butyl ammonium diethyl phenyl malonate in Dimethylacetamide In a similar apparatus as described in example 3, 3.6 g (68.4 mmoles) of acrylonitrile was added to 0.224 mmoles of initiator 2 in dimethylacetamide (20 mL) at +28° C. The reaction temperature rose from +28° C. to +47° C. After 1 hour, the polymerization was terminated by addition of acidified methanol and precipitated by pouring into excess of methanol. The precipitated poly(acrylonitrile) was filtered, washed and dried in vacuum at +50° C. to give 2.5 g polymer (70% conversion). The polydispersity index as measured by gel permeation chromatography was 1.82.

EXAMPLE 5

Polymerization of Acrylonitrile using Initiator tetra-n-butyl ammonium diethyl phenyl malonate in Dimethyl formamide In a similar apparatus as described in example 3, 3.6 g (68.4 mmoles) of acrylonitrile was added to 0.115 mmole of Initiator 2 in DMF (20 mL) at +28° C. The temperature rose to +46° C. Poly(acrylonitrile) was isolated as in example 4. Yield 2.2 g (60% conversion).

The polydispersity index as measured by gel permeation chromatography was 1.90.

EXAMPLE 6

Polymerization of Acrylonitrile using Initiator tetra-n-butyl ammonium diethyl phenyl malonate in Dimethyl formamide In a similar apparatus as described in example 3, but using a 250 mL reaction flask, 18.5 g (349 mmoles) of acrylonitrile was added to 0.96 mmoles of initiator 2 in 100 ml DMF at +28° C. The reaction temperature increased to °57° C. After 1 hour, poly(acrylonitrile) was precipitated and isolated as before to give 16.0 g of poly(acrylonitrile) (86% conversion) The polydispersity index was measured by gel permeation chromatography was 1.72.

EXAMPLE 7

Polymerization of Methacrylonitrile using Initiator tetra-n-butyl ammonium diethyl phenyl malonate in Tetrahydrofuran A dry 25 mL two necked flask equipped with magentic needle, nitrogen/argon inlet tube and rubber septum was charged with 3 mL of dry THF under argon atmosphere. To it 0.39 mmoles of the initiator 2 was added. Subsequently, 0.64 g (9.55 mmoles) of methacrylonitrile was added to the flask. The flask was held within the temperature range of +55° C. to +60° C. After 6 hours the reaction was terminated by addition of acidified methanol. The poly(methacrylonitrile) was isolated as in example 4. Yield 0.698 g (95% conversion).

The main advantages of the present invention are:

a) The polymerization can be conducted conveniently in the temperature range 0° to +60° C.

b) The initiators are derived from readily available organic compounds.

c) The initiators are free from metal ion.

d) No additional catalysts are required as in the case of group transfer polymerization (GTP).

e) The structural diversity that can be built into the initiator is very large. This allows tailoring of initiator reactively to suit the monomers.

f) The initiators have reactive functional groups, which form the head group of polymers. Thus, a range of oligomers and polymers which have reactive groups at one end of the polymer chain is available by the use of this technique.

g) The molecular weight is controlled to a predetermined value by simply adjusting the intiator concentration.

h) The process affords polymers with a relatively narrow molecular weight distribution, the polydispersity values being lower than 2.0 which are unattainable by any of the hitherto known processes.

We claim:

1. A process for the preparation of nitrile group containing polymers, which comprises reacting a nitrile group containing vinyl monomers with an initiator of the general formula $[ArCR_1R_2]^\ominus[N(R_3R_4R_5R_6)]^\oplus$, wherein Ar=phenyl, substituted phenyl or a heterocyclic compound, $R_1=R_2=$H, ester, cyano, alkyl, aryl, 1,3-oxazoline, N,N-dimethyl amide and other similar alpha activating groups, or combination of them, or one of $R_1$ to $R_2$ together with Ar, where Ar is a phenyl or substituted phenyl, is a nitrogen atom containing heterocyclic compound and the other being a nitrile group, $R_3$, $R_4$, $R_5$ and $R_6$ may be same or different and are selected from hydrocarbyl groups of 3–16 carbon atoms and represent substituted alkyl, cycloalkyl, arylalkyl or aryl or two of the $R_3$, $R_4$, $R_5$ and $R_6$ together with nitrogen atom form a heterocycle of from 5 to 7 atoms with the condition that the sum of all carbon atoms of all $R_3$, $R_4$, $R_5$ and $R_6$ is from 12 to 50 and only one of the $R_3$, $R_4$, $R_5$ and $R_6$ is an aryl derivative, in an inert atmosphere at a temperature below $+60°$ C.

2. Process as claimed in claim 1 wherein the nitrile bearing monomer is of the formula $CH_2=C(Y)X$ where $=CN$ and $Y=CH_3$, H, $-C_6H_5$, $-C_6H_5CH_2$.

3. Process as claimed in claim 1 wherein the monomer and initiator are mixed in a solvent, the solvents being chosen from amongst those having ether groups like tetrahydrofuran or, dipolar aprotic medium like dimethylformamide, dimethylacetamide, dimethylsulfoxide hexamethylphosphoric triamide and the like.

4. Process as claimed in claim 1 wherein the reaction mixture is agitated between $0°$ to $+60°$.

5. Process as claimed in claim 4 wherein the reaction mixture is held at a constant temperature for a period from 15 minutes to 2 hours, preferably for 1 hour.

6. Acrylonitrile whenever polymerized using tetra-n-butyl ammonium 2-benzyl-1,3-oxazoline according to claim 1 in the presence of solvents selected from tetrahydrofuran and N,N-dimethyl formamide.

7. Acrylonitrile whenever polymerized using tetra-n-butyl ammonium diethyl phenyl molonate according to claim 1 in the presence of solvents selected from tetrahydrofuran, dimethylacetamide and dimethyl formamide.

8. Methacrylonitrile whenever polymerized using tetra-n-butyl ammonium diethyl phenyl malonate according to claim 1 in the presence of tetrahydrofuran.

* * * * *